Jan. 10, 1950     F. J. WRIGHT     2,493,937
HYDRAULIC REVERSING CHECK VALVE
Filed May 16, 1944
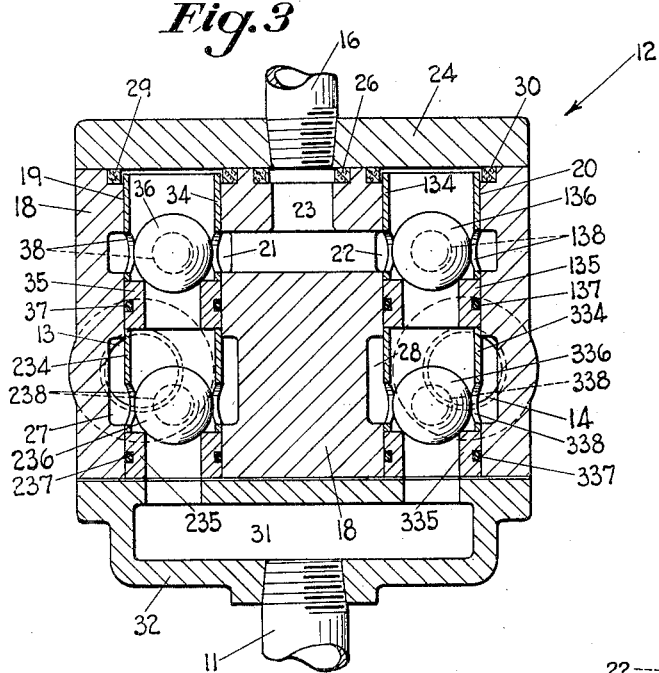
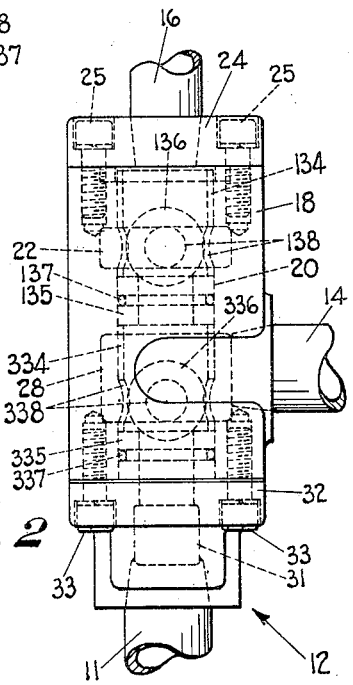
INVENTOR.
FRED J. WRIGHT,
BY Chas. M. Nissen,
ATTY.

Patented Jan. 10, 1950

2,493,937

UNITED STATES PATENT OFFICE 2,493,937

HYDRAULIC REVERSING CHECK VALVE

Fred J. Wright, Upper Arlington, Ohio, assignor, by mesne assignments, to The Jeffrey Manufacturing Company, a corporation of Ohio Application May 16, 1944, Serial No. 535,806

2 Claims. (Cl. 277—60)

This invention relates to a reversing check valve for a hydraulic system and an object of the invention is to provide such a device in which there are a minimum of parts requiring accurate machining, the wearing parts are readily replaced, and the parts are so constructed and arranged that they may be readily assembled and disassembled.

Other objects of the invention will appear hereinafter the novel features and combinations being set forth in the appended claims.

In the accompanying drawings,

Fig. 1 is a schematic piping diagram of part of a hydraulic system showing the function of the reversing check valve of my invention;

Fig. 2 is an elevational end view of the check valve of my invention; and

Fig. 3 is a transverse sectional elevational view of said check valve.

In certain hydraulic systems a pump is provided which may be reversely operated by the drive motor yet it is necessary that pressure always be supplied to a pressure conduit of the hydraulic system. The function of the reversing check valve of my invention is to make this possible.

In Fig. 1 of the drawings a portion of such a system is shown in which there is a tank 10 for the hydraulic fluid. A feed pipe or conduit 11 leads from the tank 10 to the reversing check valve designated generally by the reference character 12 which is illustrated diagrammatically in Fig. 1 of the drawings and disclosed in detail in Figs. 2 and 3 of the drawings. The reversing check valve 12 is in effect four check valves. Connected to the reversing check valve 12 is a pair of conduits or pipes 13 and 14 leading to a reversible pump 15. Also extending from the reversing check valve 12 is a pressure conduit 16 by which hydraulic pressure is conducted to any desired system. As previously mentioned, regardless of the direction of rotation of the pump 15, hydraulic fluid under pressure will always be present in conduit 16. Conduits 13 and 14 will either be suction or pressure conduits leading to the pump 15, depending on its direction of rotation.

In Fig. 1 of the drawings there is also illustrated a leakage return conduit 17 leading from the pump 15 to the tank 10.

Referring particularly to Figs. 2 and 3 of the drawings, the reversing check valve 12 includes a main body or casting 18 provided with a pair of laterally spaced equal diameter bores 19 and 20 which are of uniform diameter throughout and extend completely through the casting or body 18 from the top to the bottom. Adjacent the tops of bores 19 and 20 and communicating therewith are chambers 21 and 22 communicating with bores 19 and 20, respectively. Said chambers 21 and 22 are interconnected by a passageway or conduit 23 formed in the central portion of the body 18, which passageway 23 communicates with pressure pipe 16 which is threaded or otherwise attached to a threaded opening in a head or end plate 24 attached to the top of the casting 18 as by machine screws 25 (see Fig. 2). A compression gasket 26 provides a seal between the upwardly extending or main portion of passageway or conduit 23 and the threaded bore in end plate 24. Also adjacent the bore 19 and below the chamber 21 is another chamber 27 which communicates with said bore 19 and which leads by way of a port in said casting 18 to the conduit or pipe 13. Likewise there is a chamber 28 adjacent the bore 20 and in communication therewith which is in lateral alignment with the chamber 27 and thus positioned below the chamber 22. Chamber 28 communicates by way of a port in casting 18 with the pipe 14. As previously mentioned, the internal metal surface provided by the two equal diameter bores 19 and 20 is uniform substantially throughout its length so that they can both be formed by the simple expedient of drilling a uniform bore through the casting 18. In construction of the device these two holes may be drilled simultaneously.

Adjacent their tops the bores 19 and 20 are provided with enlarged grooves for receiving the receiving rings 29 and 30 which effect a seal between the tops of said bores and the head or end plate 24. These ends of the bores 19 and 20 are the high pressure ends and are connected to the high pressure conduit 16. Communicating with the bottoms of the two bores 19 and 20 is a feed passageway 31 formed in a bottom or end plate 32 which is attached to casting 18 by screws 33. End plate 32 has a threaded opening which threadedly receives the feed pipe 11. Within each of the bores 19 and 20 there is what in effect constitutes a pair of check valves, one associated with each of the four chambers 21, 22, 27 and 28. Each of said check valves is built up by three principal parts, the principal parts of each being identical with the other. For example, associated with chamber 21 there is a cylindrical spacer sleeve 34, a cylindrical seat ring 35 and a ball 36. Similar parts of the individual check valve associated with chamber 22 are designated 134, 135 and 136. Likewise similar parts associated with chamber 27 are designated 234, 235 and 236 and similar parts associated with the chamber 28 are designated 334, 335 and 336. It is thus evident that the three principal parts of each of the four check valves are interchangeable. This results in great saving in manufacture as well as the replaceability of worn parts.

In the assembly of the four individual check valves it is only necessary to remove one of the end plates 24 or 32 and slide the sleeves 34, 134, 234 and 334 and the seat rings 35, 135, 235 and 335 in place, the parts being assembled by alternately inserting a spacer sleeve, then a seat ring, or vice versa, depending upon which end plate is removed, and placing a ball within each spacer sleeve. To provide a seal between each seat ring 35, 135, 235 and 335, the external cylindrical surface thereof is provided with a groove in which a rubber seal ring is placed, that with ring 35 being designated 37, there being similar seal rings 137, 237 and 337 for the seat rings 135, 235 and 335, respectively.

The spacer sleeves 34, 134, 234 and 334 are provided with four radial holes 38, 138, 238 and 338, respectively, which provide free communication between the interior of the spacer sleeves and their adjacent chambers 21, 22, 27 and 28, respectively.

It is obvious that all of the spacer sleeves 34, 134, 234 and 334 and the seat rings 35, 135, 235 and 335 are generally cylindrical in structure and open at both ends. Furthermore, the external diameters of all of them are substantially equal and they have a fairly close fit with the internal cylindrical surfaces of the bores 19 and 20 with which they are associated. It is to be noted that the stacked spacer sleeves and seat rings in the bores 19 and 20 have such a total dimension longitudinally or axially of the bores 19 and 20 that there is a slight clearance between the top spacer sleeves 34 and 134 and the head or end plate 24. As a consequence, relative movement between each of the spacer sleeves and seat rings and the side walls of bores 19 and 20 is provided. In other words, there is no attempt made to fit the spacer sleeves and seat rings to the exact longitudinal dimensions of the bores 19 and 20, thus exact machining and dimensioning of the axial lengths of spacer sleeves 34, 134, 234 and 334 and seat rings 35, 135, 235 and 335 are not required.

The seat rings 35, 135, 235 and 335 and the cooperating balls 36, 136, 236 and 336 will be hardened to increase the life thereof since they are the wearing parts which actually provide the individual check valves involved. These parts, of course, can be individually hardened and therefore they are the only parts of the complete reversing check valve 12 that need this special treatment. Furthermore, seat rings 35, 135, 235 and 335 if worn, may be reversed to present new seating surfaces.

In the operation of the device, the pump 15 will be rotated in one direction and it will be presumed that it is rotating so that pipe 13 is an inlet pipe and pipe 14 a discharge pipe. Under such conditions hydraulic fluid will be drawn from the tank 10 by way of pipe 11 through passageway 31 and through the check valve provided by ball 236 and seat ring 235, in which case the ball 236 will be lifted to break the seal. Hydraulic fluid will flow through radial openings 238 in spacer sleeve 234 into chamber 27, thence to pipe 13 and pump 15. Hydraulic fluid under pressure will flow from pump 15 through pipe 14 to chamber 28 and into sleeve 334 by way of radial holes 338. This pressure in sleeve 334 will cause the ball 336 to seat on the seat ring 335, closing this individual check valve. The hydraulic fluid under pressure in sleeve 334 will flow upwardly in the cylindrical opening in ring 135 and lift the ball 136, thus flowing into sleeve 134 and through radial openings 138 thereof into chamber 22 and thence by way of passageway 23 to the pressure conduit or pipe 16 by which this hydraulic fluid is then delivered to the rest of the hydraulic system. The hydraulic fluid under pressure in passageway 23 causes pressure within the sleeve 34, which communicates therewith through radial holes 38, thus seating the ball 36 on its associated seat ring 35.

Should the pump 15 be reversed, the conduit 13 will be the output conduit and the conduit 14 will be the input conduit thereto and under these conditions hydraulic fluid from feed pipe 11 will flow upwardly through check valve 335—336 to conduit 14 and to pump 15, thence from pump 15 by way of conduit 13 and through obvious chambers, bores and passageways to check valve 35—36 and then to pressure conduit 16. The hydraulic fluid under pressure under these conditions will seal the check valves 135—136 and 235—236. The operation under these conditions is believed obvious from the brief description above given, together with the detailed description previously given of the reverse operation of said pump 15.

To reiterate briefly, it is to be noted that each of the bores 19 and 20 is provided with two check valves, the four check valves each being formed of three principal parts which are of identical construction for each valve and thus each part is interchangeable or usable in any check valve. These three parts are the spacer sleeves 34, 134, 234 and 334, the seat rings 35, 135 235 and 335 and balls 36, 136, 236 and 336. Also there are two spacer sleeves and two seat rings in each bore 19 and 20, said spacer sleeves and seat rings being stacked alternately one on top of the other in each bore 19 and 20 and being free to move a limited amount longitudinally therein after the end plates 24 and 32 are attached.

Obviously those skilled in the art may make various changes in the details and arrangement of parts without departing from the spirit and scope of the invention as defined by the claims hereto appended, and I therefore wish not to be restricted to the precise construction herein disclosed.

Having thus described an embodiment of my invention, what I desire to secure by Letters Patent of the United States is:

1. A check valve including a main body, having a bore, removable end plates attached to said body extending over said bore, a cylindrical spacer sleeve in said bore, a separate seat ring in said bore, said spacer sleeve and seat ring having outside diameters to fit into said bore and having abutting contact while being free from positive connection to each other, said end plates co-operating to hold said spacer sleeve and seat ring in said bore, and a ball in said spacer sleeve cooperating with said seat ring to provide a check seal.

2. A check valve including a main body, having a bore, removable end plates attached to said body extending over said bore, a cylindrical spacer sleeve in said bore, a separate seat ring in said bore, said spacer sleeve and seat ring having outside diameters to fit into said bore and having abutting contact while being free from positive connection to each other, said end plates co-operating to hold said spacer sleeve and seat ring in said bore, and a ball in said spacer sleeve cooperating with said seat ring to provide a check seal, said seat ring having a seal ring therein providing a seal with the bore.

FRED J. WRIGHT.

REFERENCES CITED

The following references are of record in the file of this patent:

UNITED STATES PATENTS

| Number | Name | Date |
|---|---|---|
| 439,480 | Dahlstrom | Oct. 28, 1890 |
| 751,333 | Obolensku | Feb. 2, 1904 |
| 1,270,961 | Lippert | July 2, 1918 |
| 1,388,602 | Rotteleur | Aug. 23, 1921 |
| 1,462,122 | Petersen | July 17, 1923 |
| 1,642,724 | Fleming | Sept. 20, 1927 |
| 1,775,856 | Hauser | Sept. 16, 1930 |
| 1,859,876 | Koplin | May 24, 1932 |
| 2,085,360 | Hammett | June 29, 1937 |
| 2,329,576 | Anderson | Sept. 14, 1943 |

FOREIGN PATENTS

| Number | Country | Date |
|---|---|---|
| 18,294 | Netherlands | 1928 |
| 337,339 | Great Britain | 1930 |